April 3, 1951
T. KAISH ET AL
2,547,126
ADJUSTABLE PHOTOGRAPHIC LIGHTING APPARATUS
Filed Jan. 24, 1947
2 Sheets-Sheet 1
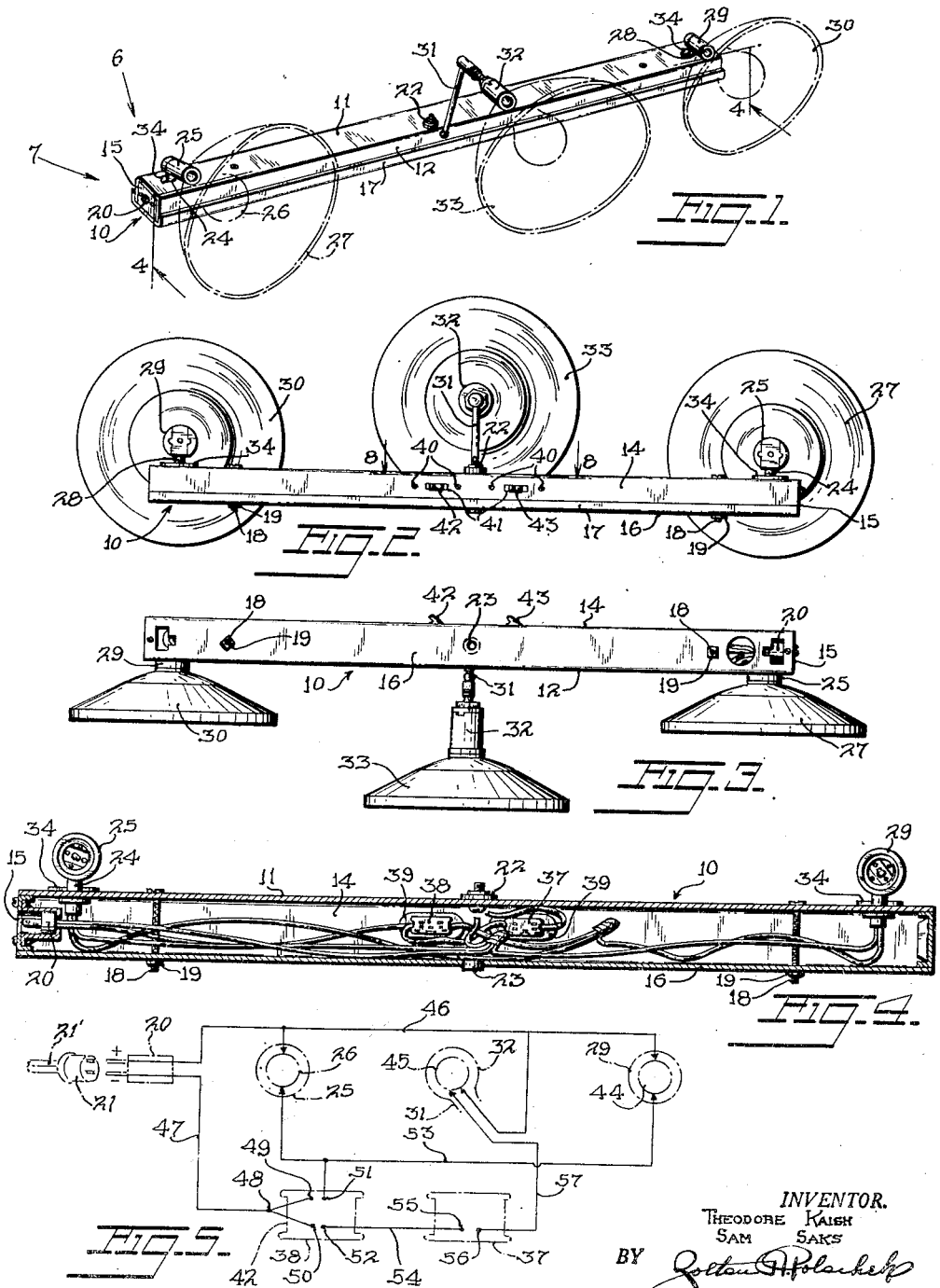
INVENTOR.
THEODORE KAISH
SAM SAKS
BY
ATTORNEY April 3, 1951 T. KAISH ET AL 2,547,126
ADJUSTABLE PHOTOGRAPHIC LIGHTING APPARATUS
Filed Jan. 24, 1947 2 Sheets-Sheet 2
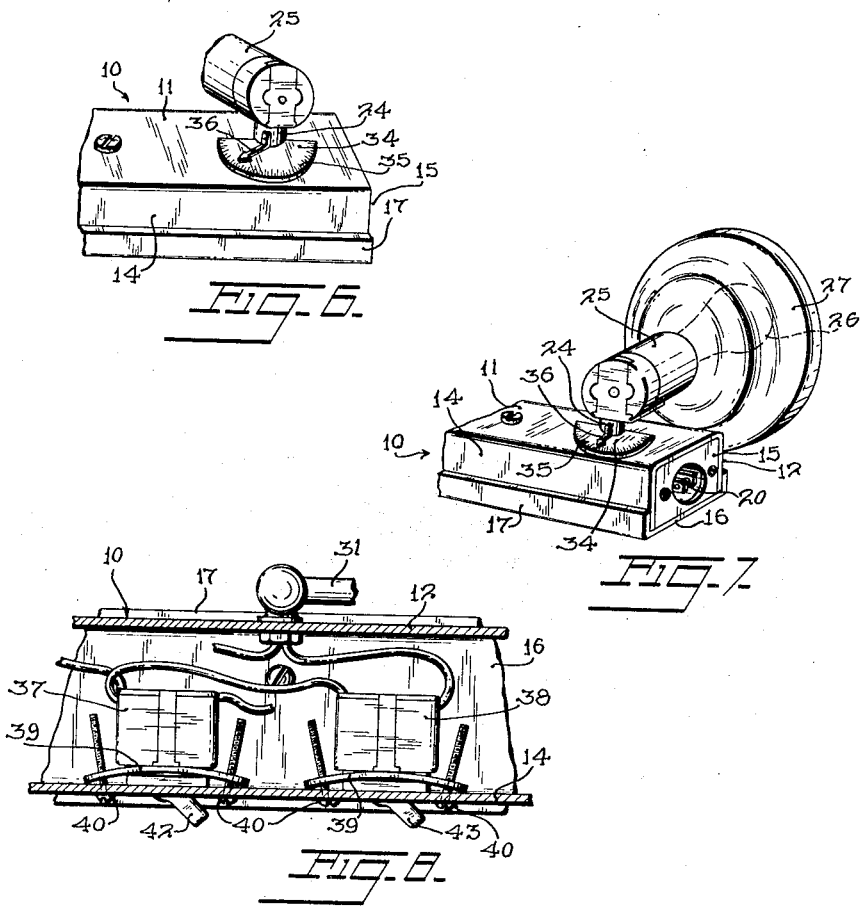
INVENTOR.
THEODORE KAISH
SAM SAKS
BY
ATTORNEY Patented Apr. 3, 1951

2,547,126

UNITED STATES PATENT OFFICE 2,547,126

ADJUSTABLE PHOTOGRAPHIC LIGHTING APPARATUS

Theodore Kaish and Sam Saks, Bronx, N. Y.

Application January 24, 1947, Serial No. 724,060

5 Claims. (Cl. 240—1.3)

This invention relates to new and useful improvements in a photographer's apparatus, and more particularly aims to provide a portable and readily fixable appliance comprising the combination of a camera mount and a plurality of floodlight units each independently variably adjustable relative to the object to be photographed, so as by various combinations of adjustments of said units said object may be illuminated with the intensity of light desired, either uniformly all over, or pursuant to the wish to have one portion or another of said object high-lighted.

The invention also provides means whereby a plurality of floodlight units, spaced along a support which sidewisely faces the object to be photographed, may have their light beams easily and perfectly converged on the object to be photographed, regardless of the distances said object is located in front of the camera lens.

In a preferred form of the invention, the support is a hollow elongate bar-like structure on the top of which, and at an intermediate point along the length of which, there is an upstanding camera mount; and at each end of which is a floodlight unit pivoted on a vertical axis, so that these units may be variously angularly moved to establish any desired plane of convergence for their light beams, to agree with the distance the object is placed ahead of the camera, and also to allow either uniform illumination in said plane or a highlighting at a portion of the object to be photographed, as at one side of a person's body or face.

Also in the preferred form of the invention, the hollow elongate bar-like structure which constitutes said support is provided at its bottom, and at an intermediate point along its length, with a recessed tripod or panning unit mount.

In combination with these features, there is a third floodlight unit which is so mounted on said bar-like structure that while the beam of light from this unit is maintained, the unit may be adjusted angularly to add central illumination to the object to be photographed but by way of a light beam swingable to the right or to the left and also up or down as desired.

Also preferably included in the combination of the invention, in regard particularly to the two end floodlight units, is what may be called a range-finding means, such means preferably comprising a calibrated scale and an index or pointer one of which is movable relative to the other, whereby angular movements of the two end flood units for convergence of their light beams relative to a plane in which the object to be photographed is placed may be readily controlled by use of the range-finding means.

Again, as the invention is preferably embodied, the floodlight units are electrically functioning ones, and the said bar-like structure houses wiring and other elements for serving the floodlight units; said elements including a switch means mounted inside said structure and having actuators projected rearwardly from the latter, and a main connector mounted in an end wall of said structure for connection to exterior leads going to a source of current supply.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view looking toward the front of a preferred embodiment of the new appliance.

Fig. 2 is a rear elevation thereof.

Fig. 3 is a bottom plan view of the appliance.

Fig. 4 is a longitudinal vertical section, taken substantially on line 4—4 of Fig. 1.

Fig. 5 is a generally diagrammatic view, showing the interior wiring of the appliance.

Fig. 6 is a fragmentary perspective, showing the end of the appliance as viewed when looking in the direction of arrow 6 in Fig. 1.

Fig. 7 is a similar view but now looking in the direction of the arrow 7 in Fig. 1.

Fig. 8 is an enlarged detail section taken on the line 8—8 of Fig. 2.

Referring to the drawing more in detail, a main bar-like support 10 is shown, by way of example, as made up of a length of thin sheet metal bent along two parallel longitudinal lines to present a rectangular top wall 11, and a front side wall 12 and a rear side wall 14. The inverted box thus partiallly established is closed at opposite ends by plates 15 carrying along their margins 90°-bent flanges whereby the said end walls are suitably secured in place.

It is pointed out, however, that the support 10 may be made of any suitable material, whether metal or not, as, for instance, a plastic, even when bent up from sheet material as just described; and in this same connection it should be understood that the support 10, or some or all of its parts, may be molded, from metal, plastic or any other suitable material.

The thus formed inverted box is completed at its bottom by a closure 16 having along its two side edges upstanding flanges 17 for engaging snugly about the bottom lengths of the side walls 12 and 14. The closure 16 is locked into assembly with the support 10 by a pair of threaded studs 18 sent down through apertures in the top wall 11 and in the closure 16, below which nuts 19 are secured to said studs.

At one end of the support 10, in one of the end plates 15, that to the left in Fig. 1 and to the right in Fig. 7, is fastened in place a connector 20 for coupling the interior wiring in the appliance to an exterior source of current supply. Such connector, as here shown, in Figs. 1 and 7, is of the well known male type carrying a plurality of prongs for coaction with a well known type of prong receiving complementary connector, such as shown at 21 in Fig. 5. The connector 21 in that view is shown as carrying a cable 21' for connection to a suitable source of current, as by means of another connector (not shown) at the other end of said cable and adapted to be inserted in a wall receptacle or the like interposed in a current carrying circuit at the place where the appliance of the invention is set up for use.

At about the middle exterior of the top wall 11 of the support 10 there is a camera mount 22, the same being a threaded stem upstanding from a nut head and sent up through an aperture in the wall 11 and then secured in place on the support 10 by application of a knurled nut, all as shown most clearly in Fig. 4.

At the bottom of the support 10, and desirably vertically below the camera mount 22 is a recessed tripod or panning unit mount 23.

One of the two end floodlight units includes a collar 24 suitably mounted in the top wall 11 for rotation about a vertical axis; and offset horizontally from the top of this collar is a socket 25 for a light bulb 26 desirably served by a reflector 27. This reflector is here shown, merely by way of example, as of the type which, being inserted in the socket, is thereafter properly held in place when the bulb is screwed fully into the socket.

The other end floodlight unit comprises a similar collection of parts, those corresponding to the elements 24, 25 and 27 being marked respectively 28, 29 and 30.

The central floodlight unit includes an L-bracket 31 suitably swivelly mounted on the front wall 12, and at the free end of the vertically extending longer arm of said bracket there is fixedly horizontally offset a socket 32, which is here shown as also carrying a light-bulb-retained reflector 33 as in the case of the two end floodlight units.

As will be understood any known or suitable type of reflector may be employed at any or all of the floodlight units; the reflectors 27, 30 and 33 as here shown having been merely conventionally indicated. For instance, if desired, a one-piece reflector-light-bulb may be used at any or all of the floodlight units.

At the rear of each of the two collars 24 and 28 of the end floodlight units, is a range-finding means, as previously mentioned. This means in each case, as shown best in Figs. 6 and 7 in the case of the collar 24, comprises two parts; a semi-circular scale 34 fixed to the upper surface of the top wall 11 and having at its own top and along its line of curvature an appropriately arranged line of calibrations 35, and a pointer or index 36 secured to said collar. The calibrations are in terms of any desired linear units, as inches or feet; and are so arranged on the scales that when the same linear reading is made on each by the associated pointer or index, both collars will have been angularly moved in such manner that their light beams merge in a plane ahead of the appliance at which the object to be photographed is placed, with this plane at a distance forward of the camera lens expressed by the linear reading of both scales.

The electrical means inside the bar-like structure 10 comprises a pair of standard switch-containing junction boxes 37 and 38. As seen best from a comparison of Figs. 4 and 8, each of said boxes near its bottom is embraced by a metal frame plate 39, these last being made of a stiffly resilient metal and longitudinally arched. Each of them at opposite ends is dimpled upwardly and there is provided with an internally threaded aperture, and screws 40 with matching threads are sent upward through the wall 14 for engagement with said apertures, so that, on turning up the screws tightly, the ends of the frame plates 39 are drawn downward to clamp against basal enlargements on the junction boxes.

Through openings 41 (Fig. 2) in the rear wall 14 extend the rockable actuators 42 and 43 for the switches in the boxes 37 and 38.

The various wirings between the connector 20 and through the junction boxes 37 and 38 to the light bulbs of the three floodlight units are pictorially shown in Figs. 4 and 8, but reference should be had to Fig. 5 for understanding of the now preferred arrangement of the wiring. The parts 25, 26, 29, 31 and 32 shown in full lines in the other views are shown in Fig. 5 in dot and dash lines, and here further similarly indicated are representations of the bulbs of the floodlight unit to the right in Fig. 2 and of the central floodlight unit. These bulbs in Fig. 5 are indicated respectively at 44 and 45.

According to the circuit arrangement of Fig. 5, a lead 46 goes from one prong of the connector 20 to the three sockets 25, 29 and 32 and thence to one terminal of each of the three light bulbs 26, 44 and 45. A lead 47 goes from the other prong of the connector 20 to a point 48, whence two leads extend respectively to the contacts 49 and 50. Normally spaced from the contacts 49 and 50 are contacts 51 and 52. From the contact 51 is a connection 53 to the two sockets 25 and 29 of the end floodlight units and thence to the other terminals of the bulbs 26 and 44.

Thus, when the actuator 42 is thrown over for toggle-lock to circuit closing position, that is, to bring the contacts 49 and 51 together, and also to bring the contacts 50 and 52 together, the two end floodlight units are energized, and at the same time the wire 54 going from the terminal 52 of the junction box 37 to contact 55 normally separated from a contact 56 in the junction box 38 is connected to the wire 47.

If, now, the actuator 43 is thrown over for toggle-lock to circuit closing position the contacts 55 and 56 are brought together, and the connection 57 to the socket 32 of the central floodlight unit and thence to the other terminal of the bulb 45, closes a circuit for that bulb.

In using the appliance, the camera is mounted on the appliance with the lens facing forward, and the floodlights are adjusted to the distance ahead of the lens at which the object to be photographed is located, which distance corresponds to the adjustment of the lens to bring said object into focus.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new and desire to secure by United States Letters Patent is:

1. A photographic illuminating device having a horizontal bar-like support having sockets at its ends for lights, a center light socket, and means for mounting the center light socket centrally on the support for movement in vertical and horizontal planes, comprising in combination means for pivotally supporting the endmost sockets on the ends of the bar-like support for turning movement in a horizontal plane and for indicating the angular turned positions of the endmost sockets, and means for illuminating light bulbs in the sockets requiring illumination of the bulbs in the endmost sockets before the bulb in the center socket can be illuminated.

2. A photographic illuminating device having a horizontal main bar-like support provided at its center with a socket for a light movable in a vertical and horizontal plane and at its ends with sockets for lights, comprising in combination means for pivotally supporting the endmost sockets on the ends of the bar-like support for turning movement in a horizontal plane and for indicating the angular turned positions of the endmost sockets, and means for illuminating light bulbs in the sockets requiring illumination of the bulbs in the endmost sockets before the bulb in the center socket can be illuminated, said first mentioned means comprising collars rotatively mounted on the top of the bar-like support at the ends thereof for rotation on a vertical axis and having the endmost sockets mounted thereon and extending radially from one side thereof, semi-circular calibrated scales mounted on the top of the bar-like support adjacent said collars and on the sides thereof opposite the sides from which the endmost sockets radially project, and pointers extending radially from said collars on substantially the sides opposite the sides from which the endmost sockets extend and operating over said calibrated scales.

3. A photographic illuminating device having a horizontal main bar-like support provided at its center with a socket for a light having a pair of terminals and movable in a vertical and horizontal plane and at its ends with sockets for lights and each having a pair of terminals, comprising in combination means for pivotally supporting the endmost sockets on the ends of the bar-like support for turning movement in a horizontal plane for indicating the angular turned positions of the endmost sockets, and means for illuminating light bulbs in the sockets requiring illumination of the bulbs in the endmost sockets before the bulb in the center socket can be illuminated, said latter-mentioned means comprising a switch having spaced pairs of contacts arranged to be simultaneously closed or opened, a second switch having a pair of contacts, a socket for connection to a source of electrical energy and having a pair of terminals, a lead connecting one terminal of said latter mentioned socket with one terminal of each of the light sockets, a lead connecting the other terminal of said latter-mentioned socket with one of the contacts of one pair of contacts of said first mentioned switch, a lead connecting one contact of the other pair of contacts of said first-mentioned switch with the other terminals of the endmost sockets, a lead connecting the other contact of the other of the pairs of contacts of said first-mentioned switch with one of the contacts of said second switch, and a lead connecting the other contact of said second switch with the other terminal of said center socket.

4. In a photographic illuminating device having a horizontal main bar-like support provided at its center with a threaded stud for supporting a camera and at its ends with sockets for lights, means for pivotally supporting the sockets on the ends of the bar-like support for turning movement in a horizontal plane and for indicating the angular turned positions of the sockets, comprising collars rotatively mounted on the top of the bar-like support at the ends thereof for rotation on a vertical axis and having the sockets mounted thereon and extending radially from one side thereof, semi-circular calibrated scales mounted on the top of the bar-like support adjacent said collars and on the sides thereof opposite the sides from which the sockets radially project, and pointers extending radially from said collars on substantially the sides opposite from which the sockets extend and operating over said calibrated scales.

5. In a photographic illuminating device having a horizontal main bar-like support provided at its center with a socket for a light having a pair of terminals and movable in a vertical and horizontal plane and at its ends with sockets for lights and each having a pair of terminals, means for illuminating light bulbs in the sockets requiring illumination of the bulbs in the endmost sockets before the bulb in the center socket can be illuminated, comprising a switch having spaced pairs of contacts arranged to be simultaneously closed or opened, a second switch having a pair of contacts, a socket for connection to a source of electrical energy and having a pair of terminals, a lead connecting one terminal of said latter-mentioned socket with one terminal of each of the light sockets, a lead connecting the other terminal of said latter-mentioned socket with one of the contacts of one pair of contacts of said first mentioned switch, a lead connecting one contact of the other pair of contacts of said first-mentioned switch with the other terminals of the endmost sockets, a lead connecting the other contact of the other of the pairs of contacts of said first-mentioned switch with one of the contacts of said second switch, and a lead connecting the other contact of said second switch with the other terminal of said center socket.

THEODORE KAISH.
SAM SAKS.

REFERENCES CITED

The following references are of record in the file of this patent:

UNITED STATES PATENTS

| Number | Name | Date |
| --- | --- | --- |
| 1,521,610 | Finesilver | Jan. 6, 1925 |
| 1,627,097 | Kauch | May 3, 1927 |
| 1,632,606 | King | June 14, 1927 |
| 1,887,708 | Cameron | Nov. 15, 1932 |
| 2,081,134 | Buckley | May 25, 1937 |
| 2,138,723 | Bell | Nov. 29, 1938 |
| 2,314,033 | Curran | Mar. 16, 1943 |
| 2,403,892 | McFarlane et al. | July 9, 1946 |
| 2,418,067 | Carpenter | Mar. 25, 1947 |
| 2,438,219 | Johnston | Mar. 23, 1948 |

FOREIGN PATENTS

| Number | Country | Date |
| --- | --- | --- |
| 342,121 | England | 1931 |